United States Patent
Yahata et al.

(10) Patent No.: US 8,137,434 B2
(45) Date of Patent: Mar. 20, 2012

(54) EXHAUST GAS PURIFICATION DEVICE OF INTERNAL COMBUSTION ENGINE

(75) Inventors: Shigeto Yahata, Obu (JP); Tsutomu Soga, Chiryu (JP); Tsukasa Kuboshima, Okazaki (JP)

(73) Assignee: Denso Corporation, Kariya (JP)

( * ) Notice: Subject to any disclaimer, the term of this patent is extended or adjusted under 35 U.S.C. 154(b) by 337 days.

(21) Appl. No.: 12/345,693

(22) Filed: Dec. 30, 2008

(65) Prior Publication Data
US 2009/0178390 A1  Jul. 16, 2009

(30) Foreign Application Priority Data
Jan. 16, 2008 (JP) ................................. 2008-006922

(51) Int. Cl.
*B01D 46/46* (2006.01)

(52) U.S. Cl. ............... 95/1; 55/385.3; 55/420; 55/523; 55/DIG. 30; 95/14; 95/273; 96/417; 96/420; 60/311

(58) Field of Classification Search ........... 55/522–524, 55/420, 385.3, DIG. 30; 422/169–172, 177–182; 60/297, 311; 95/1, 14, 273; 96/417, 420
See application file for complete search history.

(56) References Cited

U.S. PATENT DOCUMENTS

| | | | | |
|---|---|---|---|---|
| 5,711,149 | A * | 1/1998 | Araki | 60/278 |
| 6,981,369 | B2 * | 1/2006 | Miura | 60/285 |
| 2003/0213230 | A1 * | 11/2003 | Yahata et al. | 60/278 |
| 2003/0230078 | A1 * | 12/2003 | Yahata et al. | 60/295 |
| 2004/0103654 | A1 | 6/2004 | Ohtake et al. | |
| 2004/0123589 | A1 * | 7/2004 | Ohtake et al. | 60/295 |
| 2004/0128987 | A1 * | 7/2004 | Kuboshima et al. | 60/295 |
| 2005/0044846 | A1 * | 3/2005 | Yahata et al. | 60/295 |
| 2005/0154523 | A1 * | 7/2005 | Yahata et al. | 701/108 |
| 2005/0198945 | A1 * | 9/2005 | Okugawa et al. | 60/295 |
| 2006/0016179 | A1 * | 1/2006 | Okugawa et al. | 60/297 |
| 2007/0012034 | A1 * | 1/2007 | Yahata et al. | 60/295 |
| 2007/0101697 | A1 * | 5/2007 | Yahata et al. | 60/277 |
| 2007/0107390 | A1 * | 5/2007 | Morimoto et al. | 55/282.2 |

(Continued)

FOREIGN PATENT DOCUMENTS

| | | |
|---|---|---|
| JP | 2002-188493 | 7/2002 |
| JP | 2003-027921 | 1/2003 |
| JP | 2004-190668 | 7/2004 |
| JP | 2003-027921 | 1/2003 |
| JP | 2004-190668 | 7/2004 |

OTHER PUBLICATIONS

Office Action (2 pgs.) dated Jun. 20, 2011, issued in corresponding Japanese Application No. 2008-006922 with an at least partial English-language translation thereof (3 pgs.).

*Primary Examiner* — Duane Smith
*Assistant Examiner* — Amber Orlando
(74) *Attorney, Agent, or Firm* — Nixon & Vanderhye P.C.

(57) ABSTRACT

A first intake air control mode of setting an intake throttle valve to (or close to) a fully-opened state and setting an EGR valve to (or close to) a fully-closed state is performed when DPF temperature and a particulate matter deposition quantity are greater than corresponding predetermined values respectively, a no-injection operation state exists, and engine rotation speed is higher than a corresponding predetermined value. A second intake air control mode of setting the intake throttle valve to (or close to) a fully-closed state and setting the EGR valve to (or close to) a fully-opened state is performed when the DPF temperature and the particulate matter deposition quantity are greater than the corresponding predetermined values respectively, the no-injection operation state exists, and the engine rotation speed is lower than the corresponding predetermined value.

15 Claims, 8 Drawing Sheets

U.S. PATENT DOCUMENTS

2007/0125076 A1* 6/2007 Nosaka et al. .................. 60/297
2007/0169468 A1* 7/2007 Yokoi et al. .................... 60/286
2007/0180818 A1* 8/2007 Matsuoka et al. .............. 60/286
2007/0289287 A1* 12/2007 Tahara et al. .................. 60/277

* cited by examiner

INTAKE THROTTLE VALVE OPENING DEGREE

EGR VALVE OPENING DEGREE

EXHAUST GAS PURIFICATION DEVICE OF INTERNAL COMBUSTION ENGINE

CROSS REFERENCE TO RELATED APPLICATION

This application is based on and incorporates herein by reference Japanese Patent Application No. 2008-6922 filed on Jan. 16, 2008.

BACKGROUND OF THE INVENTION

1. Field of the Invention

The present invention relates to an exhaust gas purification device of an internal combustion engine.

2. Description of Related Art

Today, awareness of environmental conservation is increasing and excellent exhaust gas purification performance of an internal combustion engine is required. Specifically, for further spread of diesel engines, removal of exhaust particulates (i.e., particulate matters) such as black smoke discharged from the engine is important. In many cases, a diesel particulate filter (DPF) is equipped in an exhaust pipe for removing the particulate matters.

Since the DPF collects the particulate matters in the exhaust gas, a major part of the particulate matters is removed. However, the DPF will be clogged if the particulate matters only continue to deposit in the DPF. Therefore, it is necessary to regenerate the DPF by combusting and removing the deposited particulate matters. In order to combust the particulate matters deposited in the DPF, methods such as a post-injection are used. The post-injection injects fuel in a cylinder after a main injection.

If temperature increases excessively during the DPF regeneration, problems such as melting of the DPF or breakage of the DPF can occur. For example, if no-injection operation (i.e., operation of injecting no fuel into an engine) occurs when the temperature of the DPF is high during the regeneration of the DPF and the particulate matter deposition quantity in the DPF is large, an intake quantity decreases rapidly, so transmission of a heat inside the DPF to a downstream portion by exhaust gas is hindered. Accordingly, the heat stays and accumulates inside the DPF, thereby increasing the risk of the excessive temperature increase of the DPF. For example, the no-injection operation occurs during transition of an operation state of the engine from a normal operation state (i.e., a non-idle operation state) to an idle operation state or occurs when an engine brake is used while a vehicle is running on a downhill.

For example, Patent document 1 (JP-A-2003-27921) describes a technology that opens an intake throttle valve to increase a flow rate of the exhaust gas flowing into the DPF and to cool the DPF quickly under certain circumstances where there is a risk of the excessive temperature increase, thereby avoiding the excessive temperature increase of the DPF. Patent document 2 (JP-A-2002-188493) describes a technology that reduces a fresh air quantity by narrowing an intake throttle valve and by fully opening an EGR valve of an EGR pipe recirculating the exhaust gas. Thus, a combustion reaction of particulate matters in the DPF is suppressed to avoid the DPF excessive temperature increase.

Figure 8:
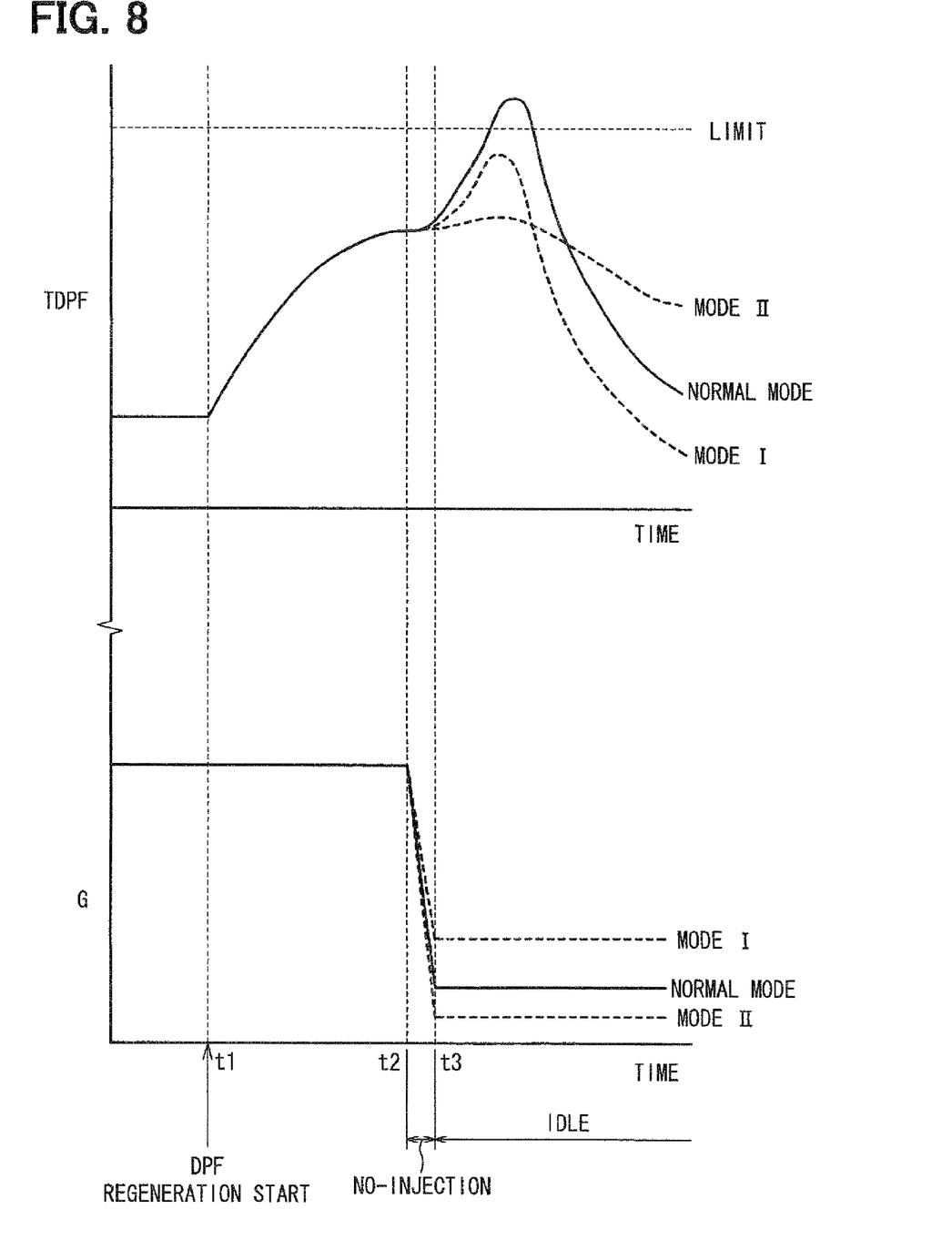
FIG. 8 is a diagram showing temporal transition of DPF temperature and the intake quantity.

An example of temporal transition of the temperature TDPF of the DPF is shown in FIG. 8. A transition of the intake quantity G is also shown in FIG. 8. In FIG. 8, broken lines (MODE I, MODE II) show the cases of Patent documents 1 and 2 respectively, and a solid line (NORMAL MODE) shows a case of normal intake air control. The normal intake air control means a case where opening degrees of the intake throttle valve and the EGR valve as of deceleration specified for each of individual devices are used. The control according to Patent document 1 is referred to as an intake air control mode I (MODE I, in FIG. 8) and the control according to patent document 2 is referred to as an intake air control mode II (MODE II, in FIG. 8) hereinafter.

In the example of FIG. 8, the DPF regeneration is started at time t1. After the no-injection operation (NO-INJECTION, in FIG. 8) starting from time t2, the operation state is changed to the idle operation state (IDLE, in FIG. 8) at time t3. As shown in FIG. 8, the DPF temperature TDPF increases after the DPF regeneration starts at the time t1. The intake quantity G decreases after the time t2. FIG. 8 shows the case where the particulate matter deposition quantity in the DPF is large.

Therefore, in the normal control shown by the solid line (NORMAL MODE), the large volume of the deposited particulate matters combusts at once after the time t2, and the heat inside the DPF stops moving downstream due to the reduction in the intake quantity G. As a result, the temperature TDPF of the DPF starts rising and eventually exceeds a temperature increase limit (LIMIT, in FIG. 8). The temperature increase limit means temperature, above which the melting or the breakage of the DPF can occur.

On the other hand, the intake air control modes I, II shown by the broken lines (MODE I, MODE II) exert the effect explained above and suppress the temperature increase of the DPF. Accordingly, the temperature TDPF does not exceed the temperature increase limit. Moreover, the response of FIG. 8 indicates that the intake air control mode I increases the intake air to move the heat in the DPF downstream, thereby quickly cooling the DPF. Moreover, it is indicated that the intake air control mode II suppresses the combustion inside the DPF, thereby relaxing the temperature increase.

The method of Patent document 1 is effective when engine rotation speed is relatively high. By increasing the flow rate of the exhaust gas, the temperature inside the DPF moves downstream and the risk of the excessive temperature increase of the DPF is reduced. However, the inventors of the present invention have knowledge that the method of Patent document 1 is not effective when the engine rotation speed is low. That is, a gas volume enough to pass the heat of the DPF downstream cannot be acquired when the engine rotation speed is low, so sufficient cooling effect cannot be acquired and the excessive temperature increase cannot be suppressed.

The method of Patent document 2 is effective when the engine rotation speed is low. By causing a state of oxygen deficiency, the risk of the excessive temperature increase of the DPF can be reduced. However, according to the knowledge of the inventors, if the method of Patent document 2 is used when the engine rotation speed is high, there can occur a problem that negative pressure in the cylinder in an intake stroke becomes excessive and oil loss via the piston ring from a cylinder wall surface occurs.

Thus, the methods of Patent documents 1 and 2 have advantages and disadvantages respectively. If the suitable method can be selected from among both methods in accordance with the situation, the problem can be avoided by utilizing the advantages of the both methods. However, such the technology has not been proposed in conventional technologies including Patent documents 1 and 2.

SUMMARY OF THE INVENTION

It is an object of the present invention to provide an exhaust gas purification device of an internal combustion engine capable of avoiding excessive temperature increase of a DPF by suitably selecting a method of increasing an exhaust gas flow rate to pass a heat of the DPF downstream or a method of reducing an intake air to suppress combustion of particulate matters during combustion of the particulate matters in the DPF.

According to an aspect of the present invention, an exhaust gas purification device of an internal combustion engine has a particulate filter, a temperature acquiring section, an estimating section, an injecting section, an intake throttle valve, an exhaust gas recirculation valve, and a controlling section.

The particulate filter is provided in an exhaust passage of the internal combustion engine for collecting particulate matters.

The temperature acquiring section acquires temperature of the particulate filter.

The estimating section estimates a deposition quantity of the particulate matters in the particulate filter.

The injecting section injects fuel into the internal combustion engine.

The intake throttle valve is provided in an intake passage.

The exhaust gas recirculation valve is provided in an exhaust gas recirculation passage, through which exhaust gas is recirculated from the exhaust passage to the intake passage.

The controlling section selects opening degrees of the intake throttle valve and the exhaust gas recirculation valve from a first opening degree range or a second opening degree range when the temperature acquired with the temperature acquiring section is higher than a first predetermined value, the deposition quantity estimated with the estimating section is greater than a second predetermined value, and the fuel injection with the injecting section is not performed.

The first opening degree range is a predetermined opening degree range including the opening degree of the intake throttle valve in a fully-opened state and the opening degree of the exhaust gas recirculation valve in a fully-closed state.

The second opening degree range is a predetermined opening degree range including the opening degree of the intake throttle valve in a fully-closed state and the opening degree of the exhaust gas recirculation valve in a fully-opened state.

Thus, when there is a risk of excessive temperature increase of the particulate filter, the controlling section selects the opening degrees from the first opening degree range including the fully-opened state of the intake throttle valve and the fully-closed state of the exhaust gas recirculation valve or the second opening degree range including the fully-closed state of the intake throttle valve and the fully-opened state of the exhaust gas recirculation valve. Accordingly, the opening degrees can be selected more appropriately than in the case of selecting the opening degrees from only either one of the opening degree ranges as in the conventional technologies. Therefore, the problem that the gas volume is too small to suppress the excessive temperature increase when the opening degrees are selected from the first opening degree range and the problem that the oil loss via the piston ring is caused by the negative pressure in the cylinder when the opening degrees are selected from the second opening degree range can be avoided. Therefore, the exhaust gas purification device capable of avoiding the excessive temperature increase of the particulate filter without causing the problems can be realized.

According to another aspect of the present invention, the exhaust gas purification device further has a rotation speed acquiring section for acquiring rotation speed of the internal combustion engine. The controlling section selects the opening degrees of the intake throttle valve and the exhaust gas recirculation valve from the first opening degree range when the rotation speed acquired with the rotation speed acquiring section is higher than a third predetermined value. The controlling section selects the opening degrees of the intake throttle valve and the exhaust gas recirculation valve from the second opening degree range when the rotation speed acquired with the rotation speed acquiring section is lower than the third predetermined value.

Thus, when the rotation speed of the internal combustion engine is high, the gas flow rate is increased to move the heat of the particulate filter downstream, thereby cooling the particulate filter. When the rotation speed of the internal combustion engine is low, the intake air quantity is reduced to suppress the temperature increase of the particulate filter by the oxygen deficiency.

Accordingly, the problem that the gas volume is too small to suppress the excessive temperature increase when the rotation speed of the internal combustion engine is low can be avoided. Furthermore, the oil loss via the piston ring, which can be caused by the negative pressure in the cylinder when the rotation speed of the internal combustion engine is high, can also be avoided. Therefore, the exhaust gas purification device capable of avoiding the excessive temperature increase of the particulate filter without causing the problems can be realized.

According to another aspect of the present invention, the exhaust gas purification device further has an intake quantity acquiring section for acquiring an intake quantity of the internal combustion engine. The controlling section selects the opening degrees of the intake throttle valve and the exhaust gas recirculation valve from the first opening degree range when the intake quantity acquired with the intake quantity acquiring section is greater than a fourth predetermined value. The controlling section selects the opening degrees of the intake throttle valve and the exhaust gas recirculation valve from the second opening degree range when the intake quantity acquired with the intake quantity acquiring section is smaller than the fourth predetermined value.

Thus, when the intake quantity is large, the opening degrees are selected from the first opening degree range to further increase the intake quantity. Thus, the heat of the particulate filter is moved downstream to cool the particulate filter. When the intake quantity is small, there is a limit to the increase of the intake quantity even if the opening degrees are selected from the first opening degree range. Therefore, in such the case, the opening degrees are selected from the second opening degree range to reduce the intake air quantity. Thus, the combustion is suppressed, and the temperature increase of the particulate filter is suppressed.

Thus, the inability to suppress the excessive temperature increase in the case where the first opening degree range is selected when the intake quantity is small can be avoided. Furthermore, the oil loss via the piston ring, which can be caused by the negative pressure in the cylinder when the intake air quantity is large, can be avoided. Thus, the exhaust gas purification device capable of appropriately selecting the opening degrees in accordance with the intake quantity and of avoiding the excessive temperature increase of the particulate filter without causing the problems can be realized.

According to another aspect of the present invention, the exhaust gas purification device further has an intake pressure acquiring section for acquiring intake pressure of the internal combustion engine. The controlling section selects the opening degrees of the intake throttle valve and the exhaust gas recirculation valve from the first opening degree range when the intake pressure acquired with the intake pressure acquiring section is lower than a fifth predetermined value. The controlling section selects the opening degrees of the intake throttle valve and the exhaust gas recirculation valve from the second opening degree range when the intake pressure acquired with the intake pressure acquiring section is higher than the fifth predetermined value.

Thus, the opening degrees are selected from the second opening degree range when the intake pressure is high. Accordingly, the combustion can be suppressed by the oxygen deficiency, thereby avoiding the excessive temperature increase of the particulate filter. Moreover, the risk of the oil loss via the piston ring can be reduced. If the opening degrees are selected from the second opening degree range when the intake pressure is low, there is a possibility that the oil loss via the piston ring is caused by the negative pressure. Therefore, in such the case, the opening degrees are selected from the first opening degree range to increase the gas flow rate. Thus, the heat of the particulate filter is moved downstream and the particulate filter is cooled. Accordingly, the exhaust gas purification device capable of appropriately selecting the opening degrees in accordance with the intake pressure and of avoiding the excessive temperature increase of the particulate filter without causing the problems can be realized.

According to yet another aspect of the present invention, the exhaust gas purification device further has an intake quantity controlling section for controlling the intake quantity of the internal combustion engine to 2 g/sec or less when the controlling section selects the opening degrees of the intake throttle valve and the exhaust gas recirculation valve from the second opening degree range.

Thus, when the opening degrees are selected from the second opening degree range, the intake quantity controlling section controls the intake quantity to 2 g/sec or less. Accordingly, the effect of the oxygen deficiency to suppress the combustion becomes remarkable, and the performance of suppression of the excessive temperature increase of the particulate filter is improved.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
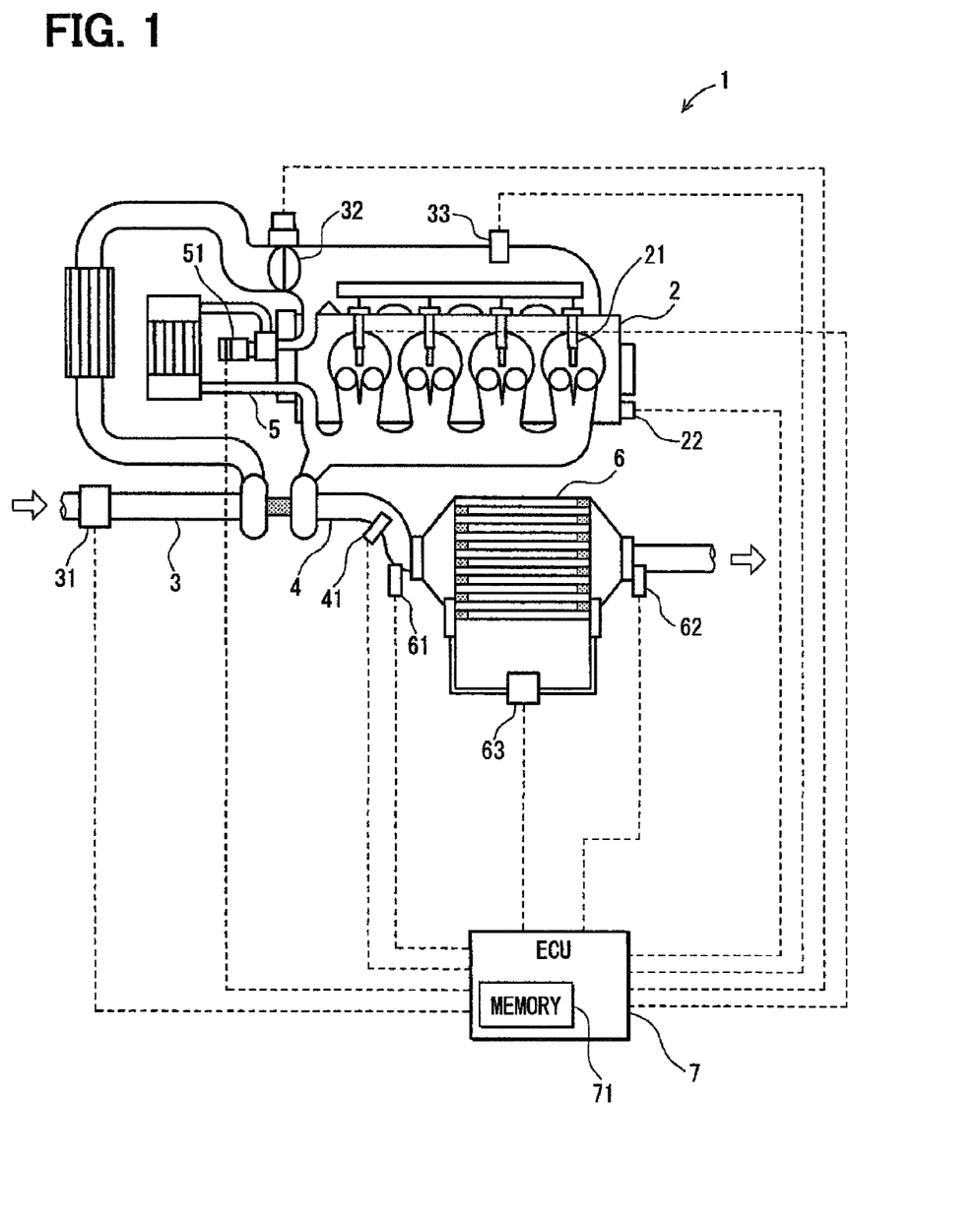
FIG. 1 is a schematic diagram showing a device configuration of an exhaust gas purification device of an internal combustion engine according to a first embodiment of the present invention.

Hereafter, embodiments of the present invention will be described with reference to the drawings. FIG. 1 is a schematic diagram showing a device configuration of an exhaust gas purification device 1 of an internal combustion engine according to a first embodiment of the present invention.

The exhaust gas purification device 1 according to the present embodiment is applied to a four-cylinder diesel engine 2 (hereafter, referred to simply as an engine), for example. The internal combustion engine and the exhaust gas purification device 1 shown in FIG. 1 mainly consist of an engine 2, an intake pipe 3, an exhaust pipe 4, and an exhaust gas recirculation pipe 5.

An air (a fresh air, an intake air) is supplied to the engine 2 through the intake pipe 3. An airflow meter 31 and an intake throttle valve 32 are arranged in the intake pipe 3. The airflow meter 31 measures an air intake quantity. A mass flow rate per unit time may be used as the intake quantity. The intake quantity supplied to the engine 2 is increased/decreased by regulating an opening degree of the intake throttle valve 32. An intake pressure sensor 33 is provided in an intake manifold for measuring intake pressure inside the intake manifold.

The engine 2 is equipped with injectors 21 and an engine rotation speed sensor 22. Fuel is supplied into a cylinder through injection from the injector 21. The engine rotation speed sensor 22 senses rotation speed (i.e., rotation number per unit time) of the engine 2. The engine rotation speed sensor 22 may be a crank angle sensor for measuring a rotation angle of a crank connected to the engine 2, for example. The sensing value of the crank angle sensor may be sent to an ECU 7, and the engine rotation speed may be calculated.

Exhaust gas is discharged to the exhaust pipe 4 connected to the engine 2. An A/F sensor 41 is arranged in the exhaust pipe 4. The A/F sensor 41 senses an air-fuel ratio.

The exhaust gas recirculation pipe 5 (i.e., an EGR pipe) is for performing exhaust gas recirculation (EGR) from the exhaust pipe 4 to the intake pipe 3. An EGR valve 51 is equipped in the EGR pipe 5. An exhaust gas recirculation quantity is regulated through opening and closing of the EGR valve 51.

A DPF 6 is arranged in the exhaust pipe 4. An oxidation catalyst may be supported on the DPF 6 such that the DPF 6 is structured as a DPF with the oxidation catalyst (i.e., a C-DPF). As a representative structure, the DPF 6 may have a honeycomb structure having passages, each of which is plugged on the inlet side or the outlet side alternately. The exhaust gas discharged during an operation of the engine 2 contains particulate matters (PM). The particulate matters are collected at an inside or a surface of a DPF wall when the exhaust gas passes through the DPF wall of the above-described structure of the DPF 6. It is necessary to regenerate the DPF 6 by combusting and removing the deposited particulate matters every time a deposition quantity of the particulate matters deposited in the DPF 6 becomes sufficiently large.

As a method for regenerating the DPF 6, a method of performing a post-injection of injecting the fuel from the injector 21 at timing after a main injection is used, for example. Exhaust temperature sensors 61, 62 are arranged respectively on an inlet side and an outlet side of the DPF 6 to measure exhaust gas temperature at the respective positions. A differential pressure sensor 63 is provided for measuring differential pressure (DPF differential pressure, DPF pressure loss) as difference of exhaust pressure between the inlet side and the outlet side of the DPF 6.

The measurement values of the airflow meter 31, the intake pressure sensor 33, the engine rotation speed sensor 22, the A/F sensor 41, the exhaust temperature sensors 61, 62, and the differential pressure sensor 63 described above are sent to the electronic control unit 7 (ECU). The ECU 7 controls timing and injection quantity of fuel injection of the injector 21 to the engine 2 and opening degree adjustment of the intake throttle valve 32 and the EGR valve 51. The ECU 7 may have a structure including a CPU for performing various types of calculation and a memory 71 for storing various types of information.

In the first embodiment, intake air control under a situation where there is a risk of excessive temperature increase of the DPF 6 is performed with the above-described device configuration. In the present embodiment, the situation where there is the risk of the excessive temperature increase of the DPF 6 means a situation where the temperature of the DPF 6 is high enough to cause combustion of the particulate matters, a particulate matter deposition quantity in the DPF 6 is large, and the above-mentioned no-injection operation is being performed.

Figure 2:
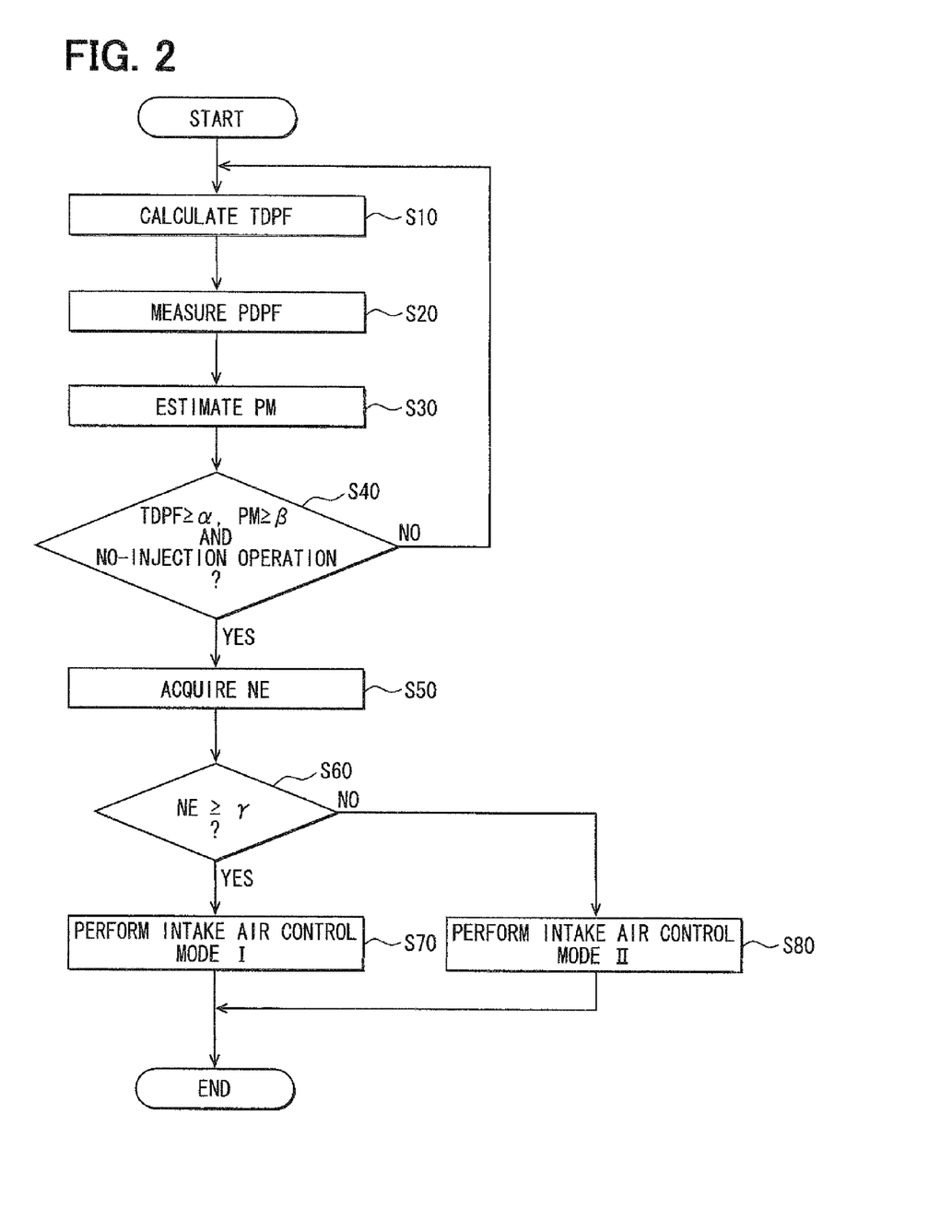
FIG. 2 is a flowchart showing intake air control mode selection processing according to the first embodiment.

FIG. 2 is a flowchart showing a processing procedure of intake air control according to the first embodiment. The procedure shown in FIG. 2 may be sequentially executed by the ECU 7. The processing of FIG. 2 may be performed during the regeneration of the DPF 6 or may be performed regardless of whether the regeneration is in execution or not. In the case where the processing of FIG. 2 is performed regardless of whether the regeneration is in execution or not, the excessive temperature increase of the DPF 6 in the case where self-sustained combustion of the particulate matters is caused by the high temperature without the assistance of the regenerating device (or method) of the DPF 6 can be also avoided.

In the flow of FIG. 2, temperature of the DPF 6 (DPF temperature TDPF) is acquired first in S10 (S means "Step"). The measurement value of the exhaust temperature sensor 61 or the exhaust temperature sensor 62 as it is may be used as the DPF temperature TDPF Alternatively, an average value of the measurement values of the exhaust temperature sensors 61, 62 may be used as an estimate of the temperature TDPF of the DPF 6. Alternatively, a model for estimating internal temperature of the DPF 6 from the measurement values of the exhaust temperature sensors 61, 62 may be acquired in advance, and the DPF temperature TDPF may be estimated using the model.

Then, the DPF differential pressure PDPF is acquired in S20. The DPF differential pressure PDPF may be measured with the differential pressure sensor 63. Then, the deposition quantity PM of the particulate matters in the DPF 6 is estimated in S30. In S30, the value of the DPF differential pressure PDPF acquired in S20 is used. The details of the estimation method in S30 will be mentioned later.

Then, it is determined in S40 whether there is a risk of the excessive temperature increase of the DPF 6. Specifically in the present embodiment, it is determined whether the DPF temperature TDPF is equal to or higher than a predetermined value (a first predetermined value $\alpha$), the particulate matter deposition quantity PM is equal to or greater than a predetermined value (a second predetermined value $\beta$), and the no-injection operation is being performed. In S40, the DPF temperature TDPF acquired in S10 is used as the DPF temperature TDPF. The particulate matter deposition quantity PM acquired in S30 is used as the particulate matter deposition quantity PM. The determination of whether the no-injection operation is being performed may use information in the ECU 7 about the fuel injection because the fuel is injected from the injector 21 based on a command from the ECU 7.

The first and second predetermined values $\alpha$, $\beta$ may be acquired beforehand as values of the DPF temperature TDPF and the particulate matter deposition quantity PM, above which there is a possibility of the excessive temperature increase of the DPF 6. If the result of the determination of S40 is affirmative (S40: YES), it is determined that there is the risk of the excessive temperature increase of the DPF 6, and the process proceeds to S50. If the result of the determination of S40 is negative (S40: NO), it is determined that there is no risk of the excessive temperature increase of the DPF 6, and the process returns to S10 to repeat the above processing.

Then, the engine rotation speed NE is acquired in S50. The engine rotation speed NE may be acquired using the engine rotation speed sensor 22. Then, in S60, it is determined whether the engine rotation speed NE acquired in S50 is equal to or higher than a predetermined value (a third predetermined value $\gamma$). If the result of the determination of S60 is affirmative (S60: YES), the process proceeds to S70. If the result is negative (S60: NO), the process proceeds to S80.

Figure 9:
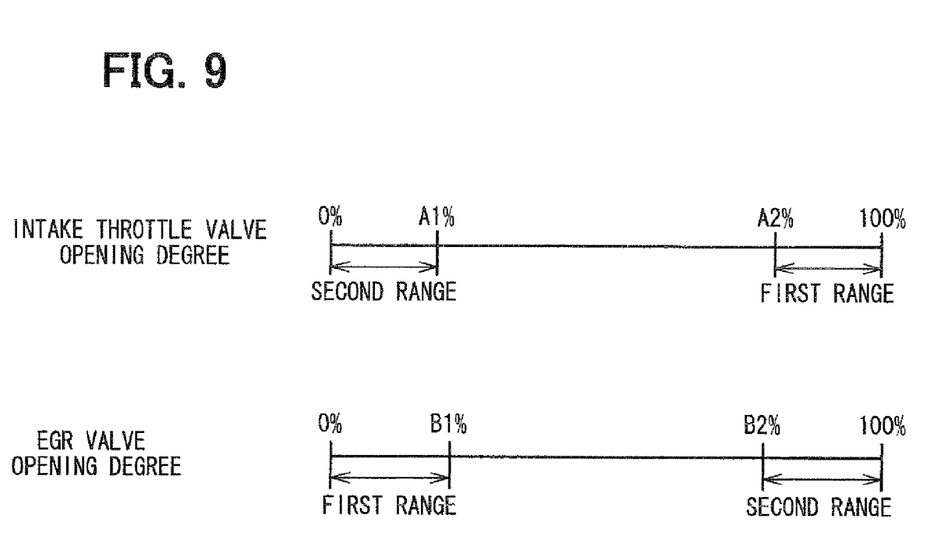
FIG. 9 is a diagram showing a first opening degree range and a second opening degree range according to the first, second or third embodiment.

The intake air control mode I is performed in S70. The intake air control mode II is performed in S80. In the intake air control modes I, II, the opening degrees of the intake throttle valve 32 and the EGR valve 51 are regulated. FIG. 9 shows ranges of the opening degrees of the intake throttle valve 32 and the EGR valve 51 regulated by the intake air control modes I, II.

As shown in FIG. 9, an opening degree range, in which the opening degree of the intake throttle valve 32 ranges from A2% to a fully-opened state (100%) and the opening degree of the EGR valve 51 ranges from a fully-closed state (0%) to B1%, is defined as a first opening degree range (FIRST RANGE, in FIG. 9). An opening degree range, in which the opening degree of the intake throttle valve 32 ranges from a fully-closed state (0%) to A1% and the opening degree of the EGR valve 51 ranges from B2% to a fully-opened state (100%), is defined as a second opening degree range (SECOND RANGE, in FIG. 9). The first opening degree range and the second opening degree range may include both ends thereof respectively. In the intake air control mode I, the opening degrees of the intake throttle valve 32 and the EGR valve 51 are arbitrarily selected from the first opening degree range. In the intake air control mode II, the opening degrees of the intake throttle valve 32 and the EGR valve 51 are arbitrarily selected from the second opening degree range.

Hereafter, effects of S60, S70 and S80 will be explained. As described above, in the intake air control mode I performed in S70, the intake throttle valve 32 is opened and the EGR valve 51 is narrowed. Thus, the flow rate of the exhaust gas flowing into the DPF 6 is increased to effectively pass the heat inside the DPF 6 downstream, thereby suppressing the excessive temperature increase of the DPF 6. The values of A2 and B1 mentioned above may be set beforehand to improve this effect.

As described above, in the intake air control mode II performed in S80, the intake throttle valve 32 is narrowed and the EGR valve 51 is opened. Thus, the fresh air quantity is reduced to reduce the oxygen quantity in the DPF 6 and to suppress the combustion reaction of the particulate matters, thereby suppressing the excessive temperature increase of the DPF 6. The values of A1 and B2 mentioned above may be set beforehand to improve this effect.

As mentioned above, in S60, either one of the intake air control modes I, II is selected in accordance with the engine rotation speed NE. If the intake air control mode I is selected in the operation range where the engine rotation speed NE is high, the effect of increasing the gas volume to a comparatively large volume and of passing the heat of the DPF 6 downstream can be exerted easily. However, the gas volume is small in the operation range where the engine rotation speed NE is low. Therefore, even if the intake air control mode I is selected in the operation range of the low engine rotation speed NE, the flow rate of the exhaust gas to the DPF 6 does not increase sufficiently. Accordingly, it is difficult to achieve the effect of passing the heat of the DPF 6 downstream with the exhaust gas. Therefore, it is desirable to select the intake air control mode I in the operation range where the engine rotation speed NE is high but it is not desirable to select the intake air control mode I in the operation range where the engine rotation speed NE is low.

If the intake air control mode II is selected in the operation range where the engine rotation speed NE is high, the negative pressure in the cylinder increases during the intake stroke, and the oil loss via the piston ring from the cylinder wall surface can occur. Even if the intake air control mode I is used in the operation range where the engine rotation speed NE is low, the oil loss via the piston ring does not occur. Therefore, it is not desirable to select the intake air control mode II in the operation range where the engine rotation speed NE is high. If the intake air control mode I is compared with the intake air control mode II, it is found that the intake air control mode I, which increases the exhaust gas quantity to pass the heat downstream, is superior in the effect of quickly cooling the DPF 6.

By taking the above into consideration comprehensively, in S60, the intake air control mode I is selected when the engine rotation speed NE is equal to or higher than the third predetermined value $\gamma$, thereby cooling the DPF 6 quickly. If the engine rotation speed NE is lower than the third predetermined value $\gamma$, the intake air control mode II is selected since the intake quantity is deficient and the intake air control mode I is not suitable. Through such the selection, the oil loss via the piston ring, which can be caused if the intake air control mode II is selected when the engine rotation speed NE is high, is also avoided. The third predetermined value $\gamma$ may be set suitably such that the determination in S60 is performed appropriately.

The opening degree of the intake throttle valve 32 in the first opening degree range may be set larger than the opening degree of the intake throttle valve 32 in the normal intake air control. The opening degree of the EGR valve 51 in the first opening degree range may be set smaller than the opening degree of the EGR valve 51 in the normal intake air control. The opening degree of the intake throttle valve 32 in the second opening degree range may be set smaller than the opening degree of the intake throttle valve 32 in the normal intake air control. The opening degree of the EGR valve 51 in the second opening degree range may be set larger than the opening degree of the EGR valve 51 in the normal intake air control. As shown in FIG. 9, the values A2, B2 may be set larger than the values A1, B1. The values A1, B1 may be set at 0 and the values A2, B2 may be set at 100. In this case, the opening degree selected in the intake air control modes I, II is only the fully-closed state or the fully-opened state. Therefore, the above-described effects become remarkable.

Next, a second embodiment of the present invention will be explained. In the second embodiment, the determination about the engine rotation speed NE in the first embodiment is replaced with determination about the intake quantity. Next, only points different from the first embodiment will be explained. In the second embodiment, the flowchart of FIG. 2 of the first embodiment is replaced with a flowchart of FIG. 3.

Figure 3:
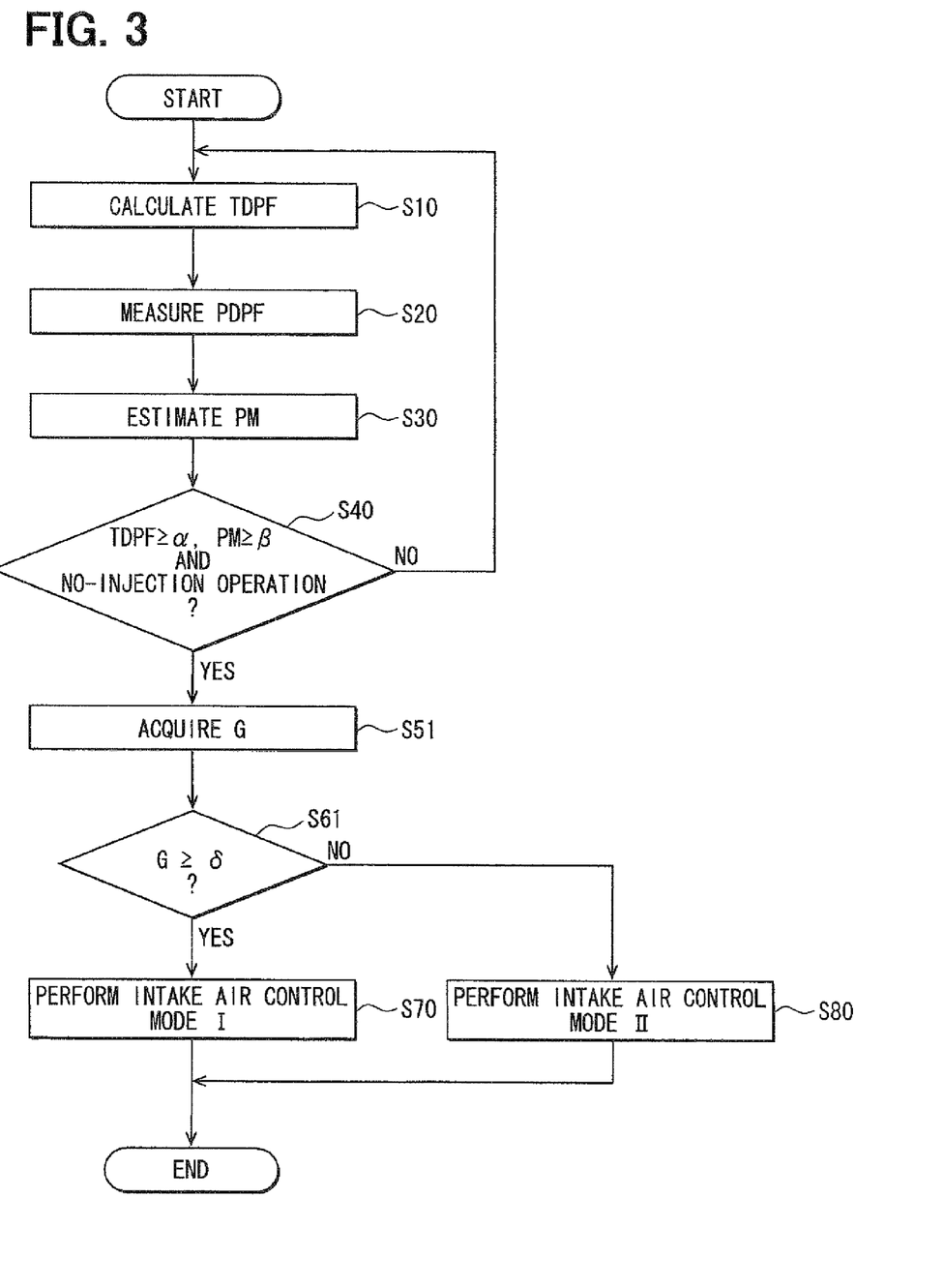
FIG. 3 is a flowchart showing intake air control mode selection processing according to a second embodiment of the present invention.

The change from FIG. 2 to FIG. 3 is that the procedures of S50 and S60 are replaced with procedures of S51 and S61. The intake quantity G is acquired in S51. The intake quantity G may be measured with the airflow meter 31. Then, in S61, it is determined whether the intake quantity G acquired in S51 is equal to or greater than a predetermined value (a fourth predetermined value $\delta$). If the result of the determination of S61 is affirmative (S61: YES), the process proceeds to S70. If the result is negative (S61: NO), the process proceeds to S80.

Figure 4:
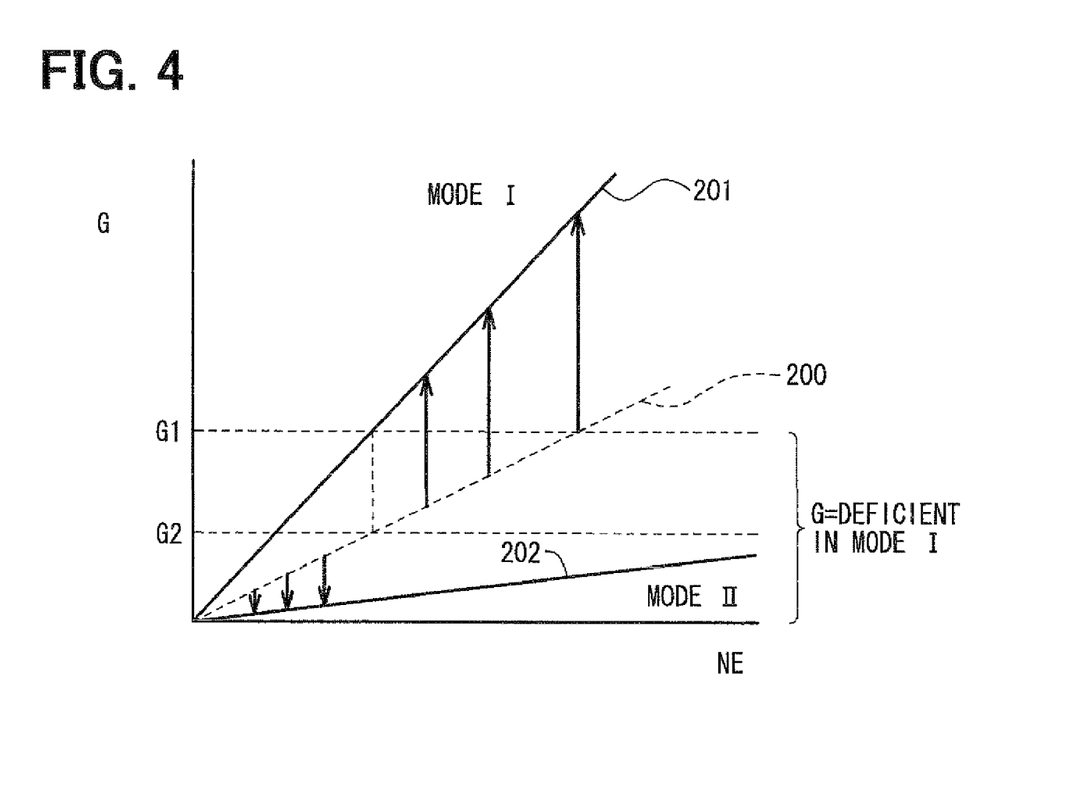
FIG. 4 is a diagram showing selection of an intake air control mode based on an intake quantity according to the second embodiment.

The meaning of the processing of S61 of the second embodiment will be explained using FIG. 4. In FIG. 4, an axis of abscissas indicates the engine rotation speed NE and an axis of ordinate indicates the intake quantity G. Two solid lines 201, 202 indicate characteristics of the intake quantity G and the engine rotation speed NE in the case where the intake air control modes I, II are used respectively. The solid lines 201, 202 are characteristics decided for each of individual devices.

If the intake air control mode I is selected and the operation is changed from the normal operation (non-idle operation) to the idle operation as shown in FIG. 8, an indication point indicating the intake quantity G and the engine rotation speed NE moves on the solid line 201 from the upper right to the lower left of the graph of FIG. 4. If the intake air control mode II is selected and the operation is changed from the normal operation (non-idle operation) to the idle operation as shown in FIG. 8, the indication point indicating the intake quantity G and the engine rotation speed NE moves on the solid line 202 from the upper right to the lower left of the graph of FIG. 4.

A broken line 200 in FIG. 4 indicates a characteristic of the intake quantity G and the engine rotation speed NE in the case where the opening degrees of the intake throttle valve 32 and the EGR valve 51 in the normal intake control are used. In the present embodiment, the normal intake air control means control for adjusting the opening degrees of the intake throttle valve 32 and the EGR valve 51 to the opening degrees of the intake throttle valve 32 and the EGR valve 51 as of the deceleration or the no-injection operation, which are normally set for each of individual devices (or for each vehicle in the case where the device is mounted in the vehicle). If the operation is changed from the normal operation (non-idle operation) to the idle operation during the normal intake air control as shown in FIG. 8, the indication point indicating the intake quantity G and the engine rotation speed NE moves on the broken line 200 from the upper right to the lower left of the graph of FIG. 4.

An intake quantity G1 shown in FIG. 4 is an intake quantity below which the effect of passing the heat of the DPF 6 downstream cannot be acquired with the increased intake quantity G (and the increased exhaust gas quantity) aimed by the intake air control mode I. A value G2 is decided based on the value G1 as shown in FIG. 4. The value G2 may be used as the above-mentioned fourth predetermined value $\delta$.

According to S61 of FIG. 3, the intake air control mode I is selected if the intake quantity G is larger than the value G2, and the intake air control mode II is selected if the intake quantity G is smaller than the value G2. Thus, if the intake quantity G is larger than the value G2 when the indication point moves on the broken line 200, the opening degrees of the intake throttle valve 32 and the EGR valve 51 are changed according to the intake air control mode I, so the intake quantity G changes (but the engine rotation speed NE does not change). Thus, the indication point moves from the broken line 200 to the solid line 201 as shown by upward arrow marks in FIG. 4.

If the intake quantity G is smaller than the value G2 when the indication point moves on the broken line 200, the opening degrees of the intake throttle valve 32 and the EGR valve 51 are changed according to the intake air control mode II, so the intake quantity G changes (but the engine rotation speed NE does not change). Thus, the indication point moves from the broken line 200 to the solid line 202 as shown by downward arrow marks in FIG. 4.

Through the movement, the indication point makes transition to the intake air control mode I when the intake quantity G is larger than the value G2. Thus, the intake quantity G is increased to the intake air quantity G1 or over, and the effect of the intake air control mode I for suppressing the DPF temperature increase can be attained. The indication point makes transition to the intake air control mode II when the intake quantity G is smaller than the value G2. Thus, when the intake air quantity G is smaller than the value G2, the DPF temperature increase suppression is performed by the intake air control mode II in consideration of the fact that the intake quantity G cannot be increased to the value G1 or over even if the intake air control mode I is performed.

Next, a third embodiment of the present invention will be explained. In the third embodiment, the determination about the engine rotation speed NE in the first embodiment is replaced with determination about intake pressure P. Next, only points different from the first embodiment will be explained. In the third embodiment, the flowchart of FIG. 2 of the first embodiment is replaced with a flowchart of FIG. 5.

The change from FIG. 2 to FIG. 5 is that the procedures of S50 and S60 are replaced with procedures of S52 and S62. The intake pressure P is acquired in S52. The intake pressure P may be measured with the intake pressure sensor 33. Then, in S62, it is determined whether the intake pressure P acquired in S52 is equal to or lower than a predetermined value (a fifth predetermined value $\epsilon$). If the result of the determination of S62 is affirmative (S62: YES), the process proceeds to S70. If the result is negative (S62: NO), the process proceeds to S80.

Figure 6:
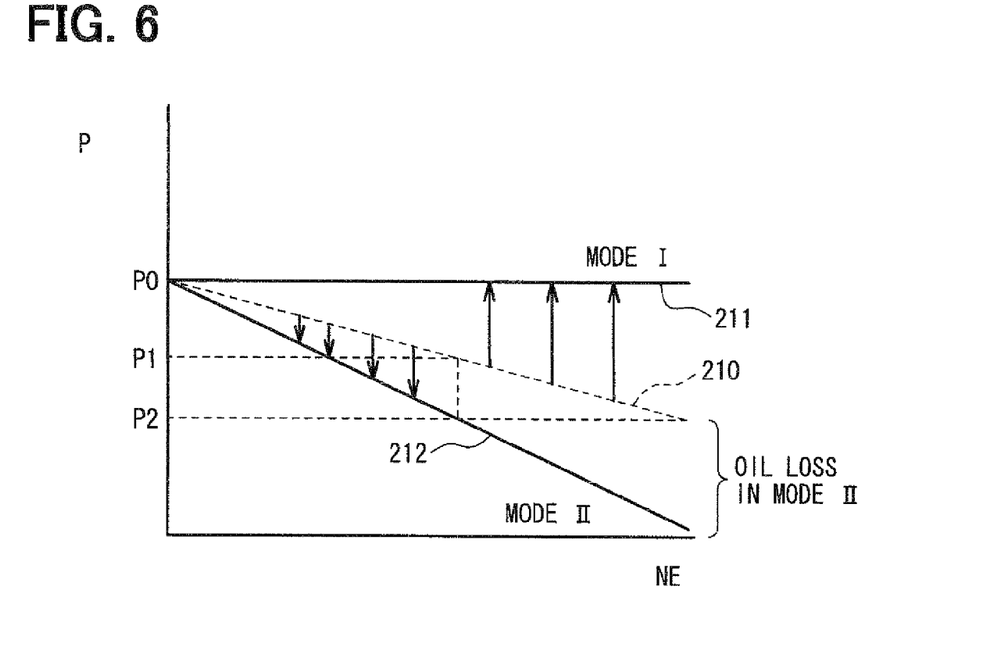
FIG. 6 is a diagram showing selection of an intake air control mode based on intake pressure according to the third embodiment.

The meaning of the processing of S62 of the third embodiment will be explained using FIG. 6. In FIG. 6, an axis of abscissas indicates the engine rotation speed NE and an axis of ordinate indicates the intake pressure P. Two solid lines 211, 212 indicate characteristics of the intake pressure P and the engine rotation speed NE in the case where the intake air control modes I, II are used respectively. The solid lines 211, 212 are characteristics decided for each of individual devices.

If the intake air control mode I is selected and the operation is changed from the normal operation (non-idle operation) to the idle operation as shown in FIG. 8, an indication point indicating the values of the intake pressure P and the engine rotation speed NE moves on the solid line 211. If the intake air control mode II is selected and the operation is changed from the normal operation (non-idle operation) to the idle operation as shown in FIG. 8, the indication point indicating the values of the intake pressure P and the engine rotation speed NE moves on the solid line 212.

A broken line 210 in FIG. 6 indicates characteristics of the intake pressure P and the engine rotation speed NE in the case of the normal intake air control (described above). If the operation is changed from the normal operation (non-idle operation) to the idle operation as shown in FIG. 8 during the normal intake air control (described above), the indication point indicating the values of the intake pressure P and the engine rotation speed NE moves on the broken line 210.

Intake pressure P2 shown in FIG. 6 is the value of the intake pressure P, below which the negative pressure increases and the oil loss via the piston ring occurs in the cylinder if the intake air control mode II is performed. As shown in FIG. 6, a value P1 is decided from the value P2. The value P1 may be used as the above-mentioned fifth predetermined value $\epsilon$. A value P0 indicates the atmospheric pressure.

Figure 5:
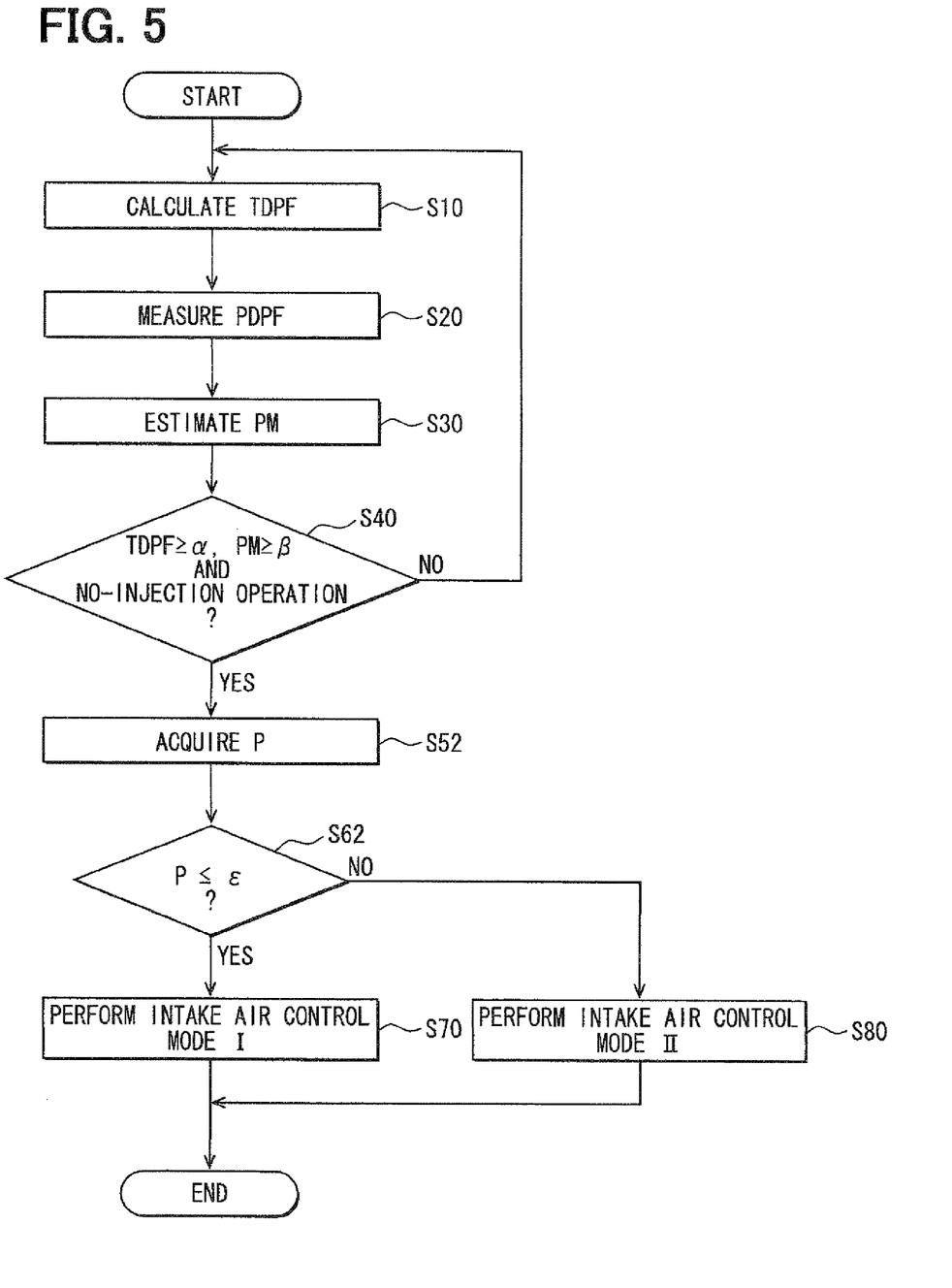
FIG. 5 is a flowchart showing intake air control mode selection processing according to a third embodiment of the present invention.

According to S62 of FIG. 5, the intake air control mode I is selected if the intake pressure P is lower than the value P1, and the intake air control mode II is selected if the intake pressure P is higher than the value P1. Thus, if the intake pressure P is lower than the value P1 when the indication point moves on the broken line 210, the opening degrees of the intake throttle valve 32 and the EGR valve 51 are changed according to the intake air control mode I, so the intake quantity G changes (but the engine rotation speed NE does not change). Thus, the indication point moves from the broken line 210 to the solid line 211 as shown by upward arrow marks in FIG. 6.

If the intake pressure P is higher than the value P1 when the indication point moves on the broken line 210, the opening degrees of the intake throttle valve 32 and the EGR valve 51 are changed according to the intake air control mode II, so the intake quantity G changes (but the engine rotation speed NE does not change). Thus, the indication point moves from the broken line 210 to the solid line 212 as shown by downward arrow marks in FIG. 6.

Through the movement, the indication point makes transition to the intake air control mode I when the intake pressure P is lower than the value P1. Thus, the oil loss via the piston ring, which can occur when the intake air control mode II is selected and the intake pressure P becomes lower than the value P2, can be avoided.

The indication point makes transition to the intake air control mode II when the intake pressure P is higher than the value P1. As shown in FIG. 6, the engine rotation speed NE is low when the intake pressure P is higher than the value P1. Therefore, the intake quantity G is also small and it is difficult to suppress the DPF temperature increase by the intake air control mode I. Therefore, when the intake pressure P is higher than the value P1, the intake air control mode II is performed to suppress the temperature increase of the DPF 6 by the oxygen deficiency.

In each embodiment, the value of the intake quantity G by the intake air control mode II during the idle operation shown in FIG. 8 may be controlled with the ECU 7 to 2 g/sec or less. By setting the value in this way, the effect of the oxygen deficiency in the intake air control mode II becomes remarkable, and it is preferable for suppression of the temperature increase of the DPF 6. In order to attain the intake quantity of 2 g/sec or less, feedback control for conforming the value of the intake quantity G to the target value equal to or less than 2 g/sec may be performed by feedback of the value of the airflow meter 31. In this case, a feedback control rule is stored as a program in the ECU 7. By the feedback control, the intake quantity of 2 g/sec or less can be attained with high accuracy.

Hereafter, a method of the particulate matter deposition quantity estimation of S30 will be explained. The inventors of the present invention have knowledge that a relationship between the particulate matter deposition quantity PM and the DPF pressure loss PDPF (i.e., the differential pressure) is shown by (or is approximated to) a relationship shown in FIG. 7. That is, an indication point indicating the particulate matter deposition quantity PM and the DPF pressure loss PDPF moves on a first characteristic line 110 from an initial point 100 toward the upper right of the graph of FIG. 7 as the operation of the internal combustion engine continues and the particulate matter deposition in the DPF 6 progresses. Then, after the indication point reaches a transition point 120, the indication point moves on a second characteristic line 130 toward the upper right of the graph.

Figure 7:
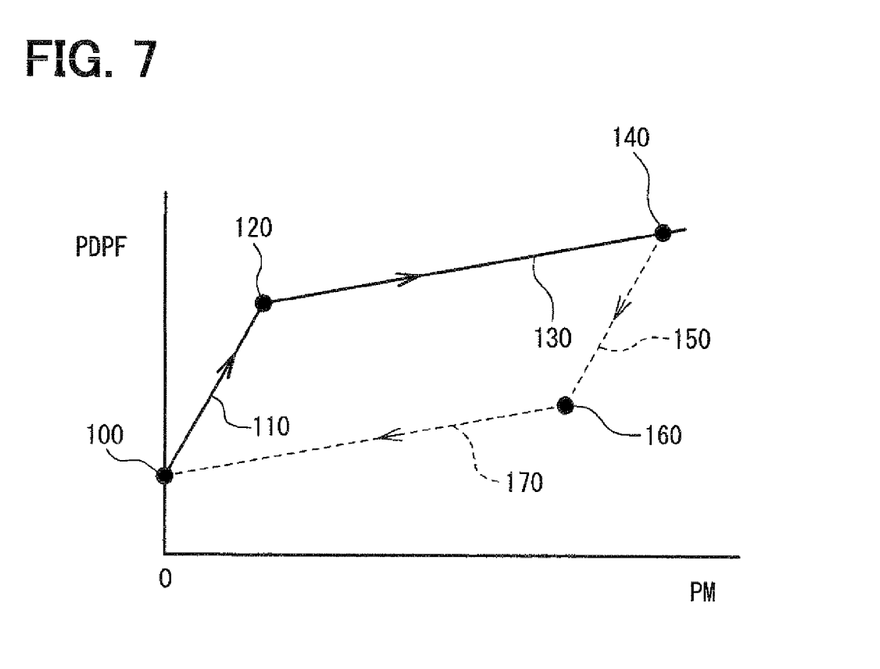
FIG. 7 is a diagram showing a relationship between a DPF pressure loss and a particulate matter deposition quantity.

The first characteristic line 110 corresponds to a stage where the particulate matters deposit in the filter wall of the DPF 6, and the second characteristic line 130 corresponds to a stage where the particulate matters deposit on the surface of the filter wall. In the case where the particulate matters deposit in the filter wall, a degree of newly narrowing flow passages of the exhaust gas is higher than in the case where the particulate matters deposit on the wall surface. Therefore, the pressure loss value PDPF is increased more in the case where the particulate matters deposit in the filter wall than in the case where the particulate matters deposit on the wall surface. Therefore, the first characteristic line 110 has an inclination larger than the second characteristic line 130 as shown in FIG. 7. The inclination indicates a ratio of an increment of the DPF pressure loss PDPF to an increment of the particulate matter deposition quantity PM.

If the characteristic shown in FIG. 7 is acquired beforehand, the particulate matter deposition quantity PM in the DPF can be estimated by obtaining the DPF pressure loss value PDPF. The DPF may be regenerated when the thus-estimated particulate matter deposition quantity PM reaches a level necessitating the regeneration.

If it is determined that the particulate matter deposition quantity PM is excessive and the DPF regeneration is started when a point 140 of FIG. 7 is reached, the indication point of the particulate matter deposition quantity PM and the DPF pressure loss PDPF subsequently makes transition as shown by broken lines in FIG. 7. That is, the values of the particulate matter deposition quantity PM and the DPF pressure loss PDPF decrease along a straight line 150 first. After a transition point 160 is passed, the values of the particulate matter deposition quantity PM and the DPF pressure loss PDPF decrease along a straight line 170 and return to the initial point 100.

The straight line 150 indicates a stage where the particulate matters deposited in the filter wall are combusting. Therefore, the inclination of the straight line 150 is the same as the first characteristic line 110. The straight line 170 indicates a stage where the particulate matters deposited on the filter wall are combusting. Therefore, the inclination of the straight line 170 is the same as the second characteristic line 130. Thus, the values of the particulate matter deposition quantity PM and the DPF pressure loss PDPF during the particulate matter deposition and the particulate matter combustion make transitions in accordance with the characteristic indicated by (or approximated by) the parallelogram shown in FIG. 7.

The characteristic line of FIG. 7 is acquired beforehand for the device configuration to be used and is stored in the memory 71. When the characteristic is stored, for example, only the coordinates of the initial point 100 and the transition point 120 and the inclinations of the characteristic lines 110, 130 may be stored. In S30, the particulate matter deposition quantity PM is estimated from the characteristic line of FIG. 7 and the measurement value of the DPF differential pressure PDPF acquired in S20. The above is the explanation about the processing of S30.

In the above embodiments, each of the values A1, B1 may be set at 3% or 5%. Each of the values A2, B2 may be set at 95% or 97%. The above-mentioned effects can be attained effectively by such the settings.

The processing of S10 constitutes a temperature acquiring section. The processing of S30 constitutes an estimating section. The processing of S60, S61, S62, S70 and S80 constitutes a controlling section. The processing of S50 constitutes a rotation speed acquiring section. The processing of S51 constitutes an intake quantity acquiring section. The processing of S52 constitutes an intake pressure acquiring section. The ECU 7 constitutes an intake quantity controlling section.

In the above embodiments, the diesel engine is used as the internal combustion engine. However, the engine is not limited to the diesel engine. Alternatively, for example, a lean burn gasoline engine may be used.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of purifying exhaust gas of an internal combustion engine, the method comprising:

acquiring temperature of a particulate filter provided in an exhaust passage of the internal combustion engine for collect in particulate matters;

estimating a deposition quantity of the particulate matters in the particulate filter;

selecting opening degrees of an intake throttle valve provided an intake passage and an exhaust gas recirculation valve provided in an exhaust gas recirculation passage, through which exhaust gas is recirculated from the exhaust passage to the intake passage, the opening degrees of the intake throttle valve and the exhaust gas recirculation valve being selected from a first opening degree range or a second opening degree range when the acquired temperature is higher than a first predetermined value, the estimated deposition quantity is greater than a second predetermined value, and fuel injection to the internal combustion engine is not performed, and acquiring rotation speed of the internal combustion engine, wherein the first opening degree range is a predetermined opening degree range including the opening degree of the intake throttle valve in a fully-opened state and the opening degree of the exhaust gas recirculation valve in a fully-closed state, the second opening degree range is a predetermined opening degree range including the opening degree of the intake throttle valve in a fully-closed state and the opening degree of the exhaust gas recirculation valve in a fully-opened state, the opening degrees of the intake throttle valve and the exhaust gas recirculation valve are selected from the first opening degree range when the acquired rotation speed is higher than a third predetermined value, the opening degrees of the intake throttle valve and the exhaust gas recirculation valve are selected from the second opening degree range when the acquired rotation speed is lower than the third predetermined value, and the opening degrees of the intake throttle valve and the exhaust gas recirculation valve are selected from the first opening degree range or the second opening degree range such that the temperature of the particulate filter does not exceed desired temperature when regeneration of the particulate filter is performed and the fuel injection is not performed.

2. A method of purifying exhaust gas of an internal combustion engine, the method comprising:

acquiring temperature of a particulate filter provided in an exhaust passage of the internal combustion engine for collecting particulate matters;

estimating a deposition quantity of the particulate matters in the particulate filter;

selecting opening degrees of an intake throttle valve provided in an intake passage and an exhaust gas recirculation valve provided in an exhaust gas recirculation passage, through which exhaust gas is recirculated from the exhaust passage to the intake passage, the opening degrees of the intake throttle valve and the exhaust gas recirculation valve being selected from a first opening degree range or a second opening degree range when the acquired temperature is higher than a first predetermined value, the estimated deposition quantity is greater than a second predetermined value, and fuel injection into the internal combustion engine is not performed, and acquiring an intake quantity of the internal combustion engine, wherein the first opening degree range is a predetermined opening degree range including the opening degree of the intake throttle valve in a fully-opened state and the opening degree of the exhaust gas recirculation valve in a fully-closed state, the second opening degree range is a predetermined opening degree range including the opening degree of the intake throttle valve in a fully-closed state and the opening degree of the exhaust gas recirculation valve in a fully-opened state, the opening degrees of the intake throttle valve and the exhaust gas recirculation valve are selected from the first opening degree range when the acquired intake quantity is greater than a third predetermined value, the opening degrees of the intake throttle valve and the exhaust gas recirculation valve are selected from the second opening degree range when the acquired intake quantity is smaller than the third predetermined value, and the opening degrees of the intake throttle valve and the exhaust gas recirculation valve are selected from the first opening degree range or the second opening degree range such that the temperature of the particulate filter does not exceed desired temperature when regeneration of the particulate filter is performed and the fuel injection is not performed.

3. A method of purifying exhaust gas of an internal combustion engine, the method comprising:

acquiring temperature of a particulate filter provided in an exhaust passage of the internal combustion engine for collecting particulate matters;

estimating a deposition quantity of the particulate matters in the particulate filter;

selecting opening degrees of an intake throttle valve provided in an intake passage and an exhaust gas recirculation valve provided in an exhaust gas recirculation passage, through which exhaust gas is recirculated from the exhaust passage to the intake passage, the opening degrees of the intake throttle valve and the exhaust gas recirculation valve being selected from a first opening degree range or a second opening degree range when the acquired temperature is higher than a first predetermined value, the estimated deposition quantity is greater than a second predetermined value, and fuel injection into the internal combustion engine is not performed, and acquiring intake pressure of the internal combustion engine, wherein the first opening degree range is a predetermined opening degree range including the opening degree of the intake throttle valve in a fully-opened state and the opening degree of the exhaust gas recirculation valve in a fully-closed state, the second opening degree range is a predetermined opening degree range including the opening degree of the intake throttle valve in a fully-closed state and the opening degree of the exhaust gas recirculation valve in a fully-opened state, the opening degrees of the intake throttle valve and the exhaust gas recirculation valve are selected from the first opening degree range when the acquired intake pressure is lower than a third predetermined value, the opening degrees of the intake throttle valve and the exhaust gas recirculation valve are selected from the second opening degree range when the intake pressure is higher than the third predetermined value, and the opening degrees of the intake throttle valve and the exhaust gas recirculation valve are selected from the first opening degree range or the second opening degree range such that the temperature of the particulate filter does not exceed desired temperature when regeneration of the particulate filter is performed and the fuel injection is not performed.

4. The method as in claim 1, further comprising:
controlling the intake quantity of the internal combustion engine to 2 g/sec or less when the opening degrees of the intake throttle valve and the exhaust gas recirculation valve are selected from the second opening degree range.

5. The method as in claim 1, wherein the first opening degree range includes an opening degree range of the intake throttle valve from the opening degree of 95% or 97% to the opening degree at the fully-opened state and an opening degree range of the exhaust gas recirculation valve from the opening degree at the fully-closed state to the opening degree of 3% or 5%.

6. The method as in claim 1, wherein the second opening degree range includes an opening degree range of the intake throttle valve from the opening degree at the fully-closed state to the opening degree of 3% or 5% and an opening degree range of the exhaust gas recirculation valve from the opening degree of 95% or 97% to the opening degree at the fully-opened state.

7. The method as in claim 2, further comprising:
controlling the intake quantity of the internal combustion engine to 2 g/sec or less when the opening degrees of the intake throttle valve and the exhaust gas recirculation valve are selected from the second opening degree range.

8. The method as in claim 2, wherein the first opening degree range includes an opening degree range of the intake throttle valve from the opening degree of 95% or 97% to the opening degree at the fully-opened state and an opening degree range of the exhaust gas recirculation valve from the opening degree at the fully-closed state to the opening degree of 3% or 5%.

9. The method as in claim 2, wherein the second opening degree range includes an opening degree range of the intake throttle valve from the opening degree at the fully-closed state to the opening degree of 3% or 5% and an opening degree range of the exhaust gas recirculation valve from the opening degree of 95% or 97% to the opening degree at the fully-opened state.

10. The method as in claim 3, further comprising:
controlling the intake quantity of the internal combustion engine to 2 g/sec or less when the opening degrees of the intake throttle valve and the exhaust gas recirculation valve are selected from the second opening degree range.

11. The method as in claim 3, wherein the first opening degree range includes an opening degree range of the intake throttle valve from the opening degree of 95% or 97% to the opening degree at the fully-opened state and an opening degree range of the exhaust gas recirculation valve from the opening degree at the fully-closed state to the opening degree of 3% or 5%.

12. The method as in claim 3, wherein the second opening degree range includes an opening degree range of the intake throttle valve from the opening degree at the fully-closed state to the opening degree of 3% or 5% and an opening degree range of the exhaust gas recirculation valve from the opening degree of 95% or 97% to the opening degree at the fully-opened state.

13. The method as in claim 1, wherein: an intake quantity in the first opening degree range is set to be greater than an intake quantity in the second opening degree range such that a fresh air quantity flowing into the particulate filter in the first opening degree range is greater than a fresh air quantity flowing into the particulate filter in the second opening degree range.

14. The method as in claim 2, wherein: an intake quantity in the first opening degree range is set to be greater than an intake quantity in the second opening degree range such that a fresh air quantity flowing into the particulate filter in the first opening degree range is greater than a fresh air quantity flowing into the particulate filter in the second opening degree range.

15. The method as in claim 3, wherein: an intake quantity in the first opening degree range is set to be greater than an intake quantity in the second opening degree range such that a fresh air quantity flowing into the particulate filter in the first opening degree range is greater than a fresh air quantity flowing into the particulate filter in the second opening degree range.

* * * * *